US009000648B2

(12) United States Patent
Harianto et al.

(10) Patent No.: US 9,000,648 B2
(45) Date of Patent: Apr. 7, 2015

(54) ASYMMETRICAL RELUCTANCE MACHINE

(75) Inventors: Cahya Harianto, West Lafayette, IN (US); Scott Sudhoff, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 500 days.

(21) Appl. No.: 13/302,303

(22) Filed: Nov. 22, 2011

(65) Prior Publication Data

US 2012/0139465 A1    Jun. 7, 2012

Related U.S. Application Data

(60) Provisional application No. 61/416,041, filed on Nov. 22, 2010.

(51) Int. Cl.
  H02K 17/42    (2006.01)
  H02K 19/10    (2006.01)

(52) U.S. Cl.
  CPC .................... *H02K 19/103* (2013.01)

(58) Field of Classification Search
  USPC ............. 310/166–168, 216.71–216.75, 310/216.071–216.075
  See application file for complete search history.

(56) References Cited

U.S. PATENT DOCUMENTS

| | | | | |
|---|---|---|---|---|
| 4,489,262 A | * | 12/1984 | Moren et al. | 318/700 |
| 5,719,456 A | * | 2/1998 | Kolomeitsev | 310/112 |
| 5,844,343 A | * | 12/1998 | Horst | 310/184 |
| 5,945,761 A | * | 8/1999 | Sakuma | 310/168 |
| 6,005,321 A | * | 12/1999 | Bolton et al. | 310/168 |
| 6,025,668 A | * | 2/2000 | Kolomeitsev | 310/187 |
| 6,072,260 A | * | 6/2000 | Randall | 310/216.092 |
| 7,135,860 B2 | * | 11/2006 | Miya et al. | 324/207.25 |
| 2006/0087192 A1 | * | 4/2006 | Norell et al. | 310/194 |

OTHER PUBLICATIONS

Boglietti A., et al., Experimental Comparison of Induction and Synchronous Reluctance Motors Performance, Conference Record of 2005 Industry Applications Conference (Fourtieth Annual IAS Meeting), vol. 1, pp. 474-479, Oct. 2005.

Boglietti, Aldo, Induction and Synchronous Reluctance Motors Comparison, pp. 2041-2044.

Chalmers, Brian and Arvind Shivran Mulki, Design and Performance of Reluctance Motors With Unlaminated Rotors, IEEE Winter Meeting, New York, N.W., Jan. 30-Feb. 4, 1972, pp. 1562-1569.

Cruickshank, A.J.O, et al., Theory and Performance of Reluctance Motors With Axially Laminated Anisotropic Rotors, pp. 887-894, Proc. IEE, vol. 118, No. 7, Jul. 1971.

(Continued)

*Primary Examiner* — Thanh Lam
(74) *Attorney, Agent, or Firm* — Purdue Research Foundation

(57) ABSTRACT

A reluctance machine is disclosed. The reluctance machine includes a stationary member including a housing, a plurality of windings disposed in the housing, a plurality of electrical connections each electrical connection coupled to a corresponding winding of the plurality of windings, and a plurality of teeth coupled to the housing, a rotating member having a center including a mechanical coupling member formed about the center, and a plurality of outwardly protruding poles centrally located within the stationary member each outwardly protruding pole having a continuous outer surface adjacent to at least one tooth of the plurality of teeth, wherein each outer surface of each outwardly protruding pole having a first portion being a first distance away from the center and a second portion being a second distance away from the center.

20 Claims, 10 Drawing Sheets

(56) References Cited

OTHER PUBLICATIONS

Germishuizen, F.S., et al., Performance Comparison of Reluctance Synchronous and Induction Traction Drives for Electrical Multiple Units, pp. 316-323.

Honsinger, Vernon, The Inductances Ld and Lq of Reluctance Machines, IEEE Winter Meeting, New York, N.Y., Jan. 25-30, 1970, pp. 298-304.

Honsinger, V.B., Sizing Equations for Electrical Machinery, IEEE Transactions on Energy Conversion, vol. EC-2, No. 1, Mar. 1987, pp. 116-121.

Huang, S., M. Aydin, T.A. Lipo, A Direct Approach to Electrical Machine Performance Evaluation: Torque Density Assessment and Sizing Optimization.

Huang, Surong, et al., A General Approach to Sizing and Power Density Equations for Comparison of Electrical Machines, IEEE Transactions on Industry Applications, vol. 34, No. 1, Jan./Feb. 1998, pp. 92-97.

Kamper, M.J., F.S. van der Merwe, Direct Finite Element Design Optimisation of the Cageless Reluctance Synchronous Machine, IEEE Transactions on Energy Conversion, vol. 11, No. 3, Sep. 1996, pp. 547-555.

Lawrenson, P.J., Agu, L.A., Theory and Performance of Polyphase Reluctance Machines, Proc, IEE, vol. 111, No. 8, Aug. 1964, pp. 1435-1445.

Lipo, T.A., Synchronous Reluctance Machines—A viable Alternative for AC Drives?, Research Report 91-5, Department of Electrical and Computer Engineering, May 1991.

Matsuo, Takayoshi, Lipo, Thomas A., Rotor Design Optimization of Synchronous Reluctance Machine, IEEE Transactions on Energy Conversion, vol. 9, No. 2, Jun. 1994, pp. 359-365.

Niazi, Peyman, Permanent Magnet Assisted Synchronous Reluctance Motor Design and Performance Improvement, A Dissertation, Submitted to the Office of Graduate Studies of Texas A&M University, Dec. 2005.

Sudhoff, Scott, D, et al., Genetic Algorithm Based Design of a Permanent Magnet Synchronous Machine, pp. 1011-1019.

Niazi, Peyman, Permanent Magnet Assisted Synchronous Reluctance Motor Design and Performance Improvement, Dissertation Submitted to the Office of Graduate Studies of Texas A&M University, Dec. 2005.

\* cited by examiner

ASYMMETRICAL RELUCTANCE MACHINE

CROSS REFERENCE TO RELATED APPLICATIONS

The present application is related to and claims the priority benefit of U.S. Provisional Patent Application Ser. No. 61/416,041 filed Nov. 22, 2010, the content of which is hereby incorporated in its entirety into the present disclosure.

STATEMENT REGARDING GOVERNMENT FUNDING

This invention was made with government support under ONR N00014-08-1-0080 awarded by Office of Naval Research. The government has certain rights in the invention.

TECHNICAL FIELD

The present disclosure generally relates to reluctance machines and particularly to reluctance machines providing high torque density.

BACKGROUND

Over the past few years, effort in the prior art has been expanded to develop a reluctance machine with high efficiency and high torque production capability relative to physical size. A reluctance machine is a type of magnetic device, e.g., a motor, where magnetic poles are induced in a rotating non-magnetic member (i.e., a rotor) by at least one winding in a stationary member (i.e., a stator). The rotor is typically provided with a plurality of salient (i.e., outwardly projecting) poles. The poles are induced by applying electrical current to the winding.

A reluctance machine can be constructed in the form of at least a synchronous reluctance machine, a variable reluctance machine, or a switched reluctance machine. A synchronous reluctance machine is configured to have a rotating field in the stator windings. A magnetomotive force (MMF) is thereby produced which acts upon the rotor resulting in the rotor being rotated at a synchronous speed which is substantially equal to the speed of the rotating field in the stator.

Reluctance machines can be constructed to have distributed windings or concentrated windings. In a reluctance machine with distributed windings, the windings are distributed substantially around the entire stator. A winding can be as simple as a single coil, although a single-coil winding is atypical, or generally, the winding can include multiple coils in series/parallel, where the coils are different sizes in that they have different numbers of turns and span different portions of the stator. Generally, the pattern of a distributed winding can be complicated. In either case (i.e., distributed or concentrated windings), the windings can be configured to be coupled to a voltage source with single, two, or multiple phases. Each winding is associated with one phase. For example, using a delta and wye connectivity, as is known to a person having ordinary skill in the art, three-phase power can be coupled to three windings (distributed or concentrated).

Exemplary prior art reluctance machines with distributed windings (FIG. 9A) and concentrated windings (FIG. 9B) are depicted in FIGS. 9A and 9B. A cross-sectional view of a typical reluctance machine configuration with distributed windings is shown in FIG. 9A. The reluctance machine 10 includes a stator assembly 12 and a rotor assembly 14. The stator assembly 12 includes a stator body 20 (also referred to as housing) with a plurality of stator teeth 22 coupled thereto. Windings (not shown) are provided around and about the stator teeth 22 in a distributed fashion. The rotor assembly 14 is centrally mounted within the stator assembly 12. The rotor assembly 14 includes a plurality of protruded poles 30 each having a pole face 32 that is substantially parallel with an interior surface defined by adjacent stator teeth 22. The rotor assembly 14 further includes a rotor core 26 and a shaft 24 centrally located about the rotor core 26. The reluctance machine 10 depicted in FIG. 9A includes a large number of stator teeth where many teeth are associated with a winding (not shown), and the associated phase. In the exemplary embodiment of the prior art depicted in FIG. 9A, the conventional reluctance machine may include three windings, each associated with a phase, where the windings are distributed around the teeth 22 (where a large number of teeth 22 are provided around the stator body). The rotor assembly 14, as depicted in FIG. 9A, includes four protruded poles 30, although it may include less or more poles.

Referring to FIG. 9B, another exemplary embodiment of a stator assembly 40 is depicted. Similar to the stator assembly 12, the stator assembly 40 includes a stator body 42 and a plurality of stator teeth 44. Between each set of stator teeth 44 are cavities formed within the stator body 42 to accommodate a plurality of concentrated windings 46. In the embodiment of FIG. 9B, the windings 46 are adapted to be powered by a three-phase power configuration, as identified by phase connectivity P1, P2, and P3. Application of electrical currents to the windings 46 generate a rotating field which causes a rotor assembly (e.g., the rotor assembly 14 of FIG. 9A) to rotate within the space defined by the stator assembly 40. The rotating field results in an output torque provided from the reluctance machine (e.g., the reluctance machine 10 of FIG. 9A).

Referring back to FIG. 9A, it should be noted that spacing (i.e., the air gap) between the pole face 32 of each pole 30 and the adjacent stator teeth 22 remains substantially constant. The consistency in the air gap results in the same torque output capability in either a clockwise 38 or a counter clockwise 36 rotational direction. In particular, as a leading edge 34b of a rotor pole 30 approaches the next stator tooth 22 when the rotor assembly 14 is rotating in the direction depicted by arrow 38 (i.e., clockwise directions), the output torque remains substantially the same as if a trailing edge 34a of a rotor pole 30 approaches the next stator tooth 22 when the rotor assembly 14 is rotating in the direction depicted by arrow 36 (i.e., counter clockwise) corresponding with a reversal of the rotational direction of the stator MMF.

Attempts to improve the performance of the synchronous reluctance machines are typically associated with design of the rotor assembly 14 of the reluctance machine 10 such that it will result in improved performance. One category of performance is torque density which is the amount of torque that is generated relative to the physical size or mass of the machine for a given amount of loss. The rotor assembly 14 depicted in FIG. 9A, although simple and can be manufactured at a relatively low cost, has relatively poor performance in terms of torque density, since flux density (i.e., the MMF resulting in output torque) varies considerably over the pole faces 32 of the pole 30, as discussed further below. Therefore the spatial region of high flux density is limited (which is a function of position within the rotor assembly 14), if a high degree of saturation (which leads to high loss) is avoided.

Several rotor designs can be found in the prior art. These include rotors with slits, rotors with segmentation, rotors with axial lamination, and rotors with transverse lamination. These rotor designs are generally directed at improving torque characteristics of the machine, however, the goal remains in developing a reluctance machine with further improved torque density for a given loss level over the rotor designs provided in the prior art. Furthermore, a rotor design that can improve the uniformity of the field over the rotor pole to improve torque ripple remains elusive.

Therefore, there is a need for a reluctance machine that improves output torque density based on the relationship between the rotor shape and the stator as well as providing a substantially uniform and maximized flux density over the face of the rotor pole (without a high degree of saturation and loss) thereby substantially maximizing toque density while substantially minimizing torque ripple.

SUMMARY

A reluctance machine is disclosed. The reluctance machine includes a stationary member. The stationary member includes a housing, a plurality of windings disposed in the housing, a plurality of electrical connections each electrical connection coupled to a corresponding winding of the plurality of windings, and a plurality of teeth coupled to the housing. The reluctance machine further includes a rotating member having a center including a mechanical coupling member formed about the center, and a plurality of outwardly protruding poles centrally located within the stationary member. Each outwardly protruding pole has a continuous outer surface adjacent to at least one tooth of the plurality of teeth, wherein each outer surface of each outwardly protruding pole has a first portion being a first distance away from the center and a second portion being a second distance away from the center.

A drive system is disclosed. The drive system includes a voltage source, and a reluctance machine configured to be coupled to a mechanical load. The reluctance machine includes a stationary member. The stationary member includes a housing, a plurality of windings disposed in the housing, a plurality of electrical connections each electrical connection coupled to a corresponding winding of the plurality of windings, and a plurality of teeth coupled to the housing. The reluctance machine further includes a rotating member having a center including a mechanical coupling member formed about the center, and a plurality of outwardly protruding poles centrally located within the stationary member each outwardly protruding pole has a continuous outer surface adjacent to at least one tooth of the plurality of teeth, wherein each outer surface of each outwardly protruding pole has a first portion being a first distance away from the center and a second portion being a second distance away from the center.

DETAILED DESCRIPTION

Figure 1:
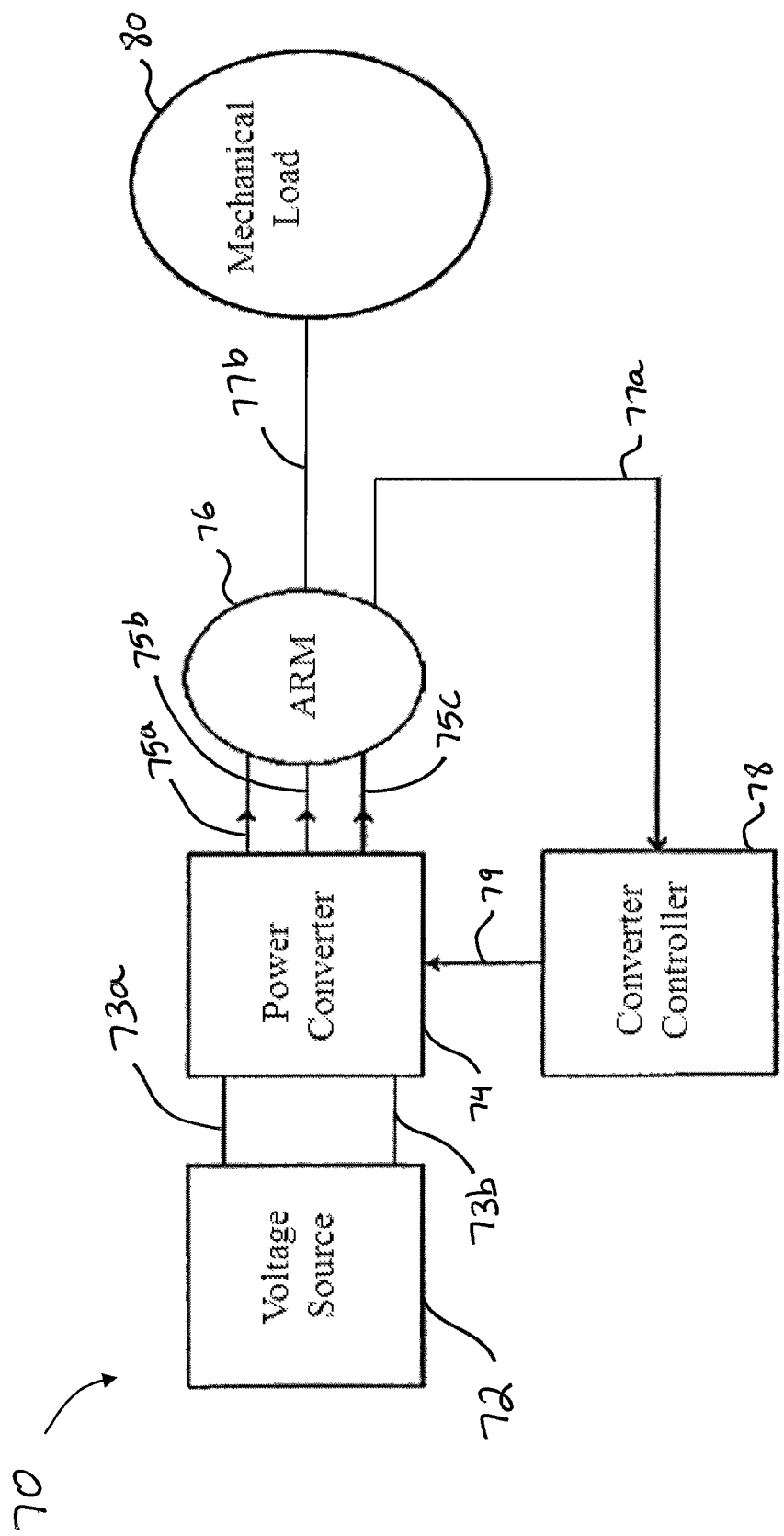
FIG. 1 is a block diagram of a drive system including an asymmetrical reluctance machine (ARM).

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

A novel reluctance machine has been developed which improves torques output in one direction as compared to known prior art reluctance machines. The reluctance machine includes an asymmetrical rotor assembly and is thereby referred to as an asymmetrical reluctance machine (ARM).

Referring to FIG. 1, a block diagram of a drive system 70 is depicted. The drive system 70 in an exemplary embodiment which includes a voltage source 72 and a power converter 74 coupled to the voltage source 72. The voltage source 72 is typically a single phase direct current (DC) source; however, single and multi-phase alternating current (AC) outputs are also possible. The voltage source 72 may represent power available at an electrical outlet. In such a configuration, an electrical conductor 73a represents a power output and an electrical conductor 73b represents a return (or commonly referred to as the neutral). Alternatively, the conductors 73a and 73b may represent conductors of a DC voltage source.

The power converter 74 includes power inputs which are connected to the conductors 73a and 73b to receive one of a DC power, a single-phase electrical current or a multi-phase electrical current (wherein, in a multi-phase AC configuration there are corresponding conductors). Additionally, the power converter 74 includes an input which is coupled to an output 79 of a converter controller 78, described further below. The Power converter 74 also includes three outputs representing three phases with currents that are each separated by 120 electrical degrees. Each phase is provided on a conductor 75a, 75b, and 75c. It should be noted that a common neutral line for return of each phase of the electrical currents is not shown and may or may not be present. It should also be appreciated that the power converter 74 may produce more or less number of phases (i.e., more or less than three phases).

The drive system 70 also includes an ARM 76 which is coupled to the power converter 74. The ARM 76 may include a plurality of inputs which are connected to the conductors 75a, 75b, and 75c. The inputs are coupled to respective windings, described further below (see FIG. 3) which are distributed about a stator. The ARM 76 includes a signal output 77a, which in one embodiment represents position of a rotor assembly 140 (see FIG. 3) with respect to a stator assembly 110 (see FIG. 3). The ARM 76 also includes a mechanical output 77b which can be an interface for a mechanical coupling between the ARM 76 and a mechanical load 80.

The drive system 70 also includes the converter controller 78 which is coupled to the ARM 76 and the power converter 74. The converter controller 78 includes an input which is coupled to the signal output 77a of the ARM 76. The signal output 77a represents a feedback signal from the ARM 76 that can be used to control the power converter 74. In one embodiment, this feedback signal is the position of the rotor assembly 140 (see FIG. 3). In such an embodiment, the feedback signal (i.e., the signal output 77a) can be output of a variable reluctance (VR) sensor, an optical sensor, a hall-effect sensor, or other position determining sensors known to a person having ordinary skill in the art. These sensors may be positioned on the rotor assembly 140 (see FIG. 3), on the stator assembly 110 (see FIG. 3), or positioned on both. Circuitry for conditioning the signal output 77a can be placed in the ARM 76 or in the converter controller 78. Additionally, the converter controller 78 includes the output 79 which is coupled to the power converter 74. The output 79, therefore, represents the control signal from the converter controller 78 which is used to control the power converter 74. The combination of proper winding distribution and current waveform generate a desired stator magnetomotive force (MMF) distribution relative to the rotor assembly 140 (see FIG. 3).

It should be appreciated that in an alternative embodiment the power converter 74 may be avoided and the ARM 76 powered directly by the voltage source 72.

It should also be appreciated that a synchronous reluctance machine is different than the ARM 76, in that windings positioned in the rotor are short circuited to assist in startup (often referred to as damper windings). In such a configuration, the reluctance machine can be operated directly from a polyphase voltage source; thereby eliminating the need for power electronics or controls. However, the drive system 70 depicted in FIG. 1, includes the signal output 77a (i.e., control and rotor position feedback), thereby the aforementioned damper windings are not necessary. Addition of such a damper winding to the rotor of the ARM 76, would have the advantage of being able to be operated without the power converter 74 or control scheme/electronics.

It should be appreciated that while the ARM 76 of FIG. 1 is depicted as a reluctance machine that can receive electrical power to produce mechanical power, it can also be used such that it receives mechanical power and thereby converts that to electrical power. In such a configuration, the power converter 74 is utilized to excite the winding using a proper control and thereafter extract electrical power from the ARM 76 while receiving mechanical power.

Figure 2:
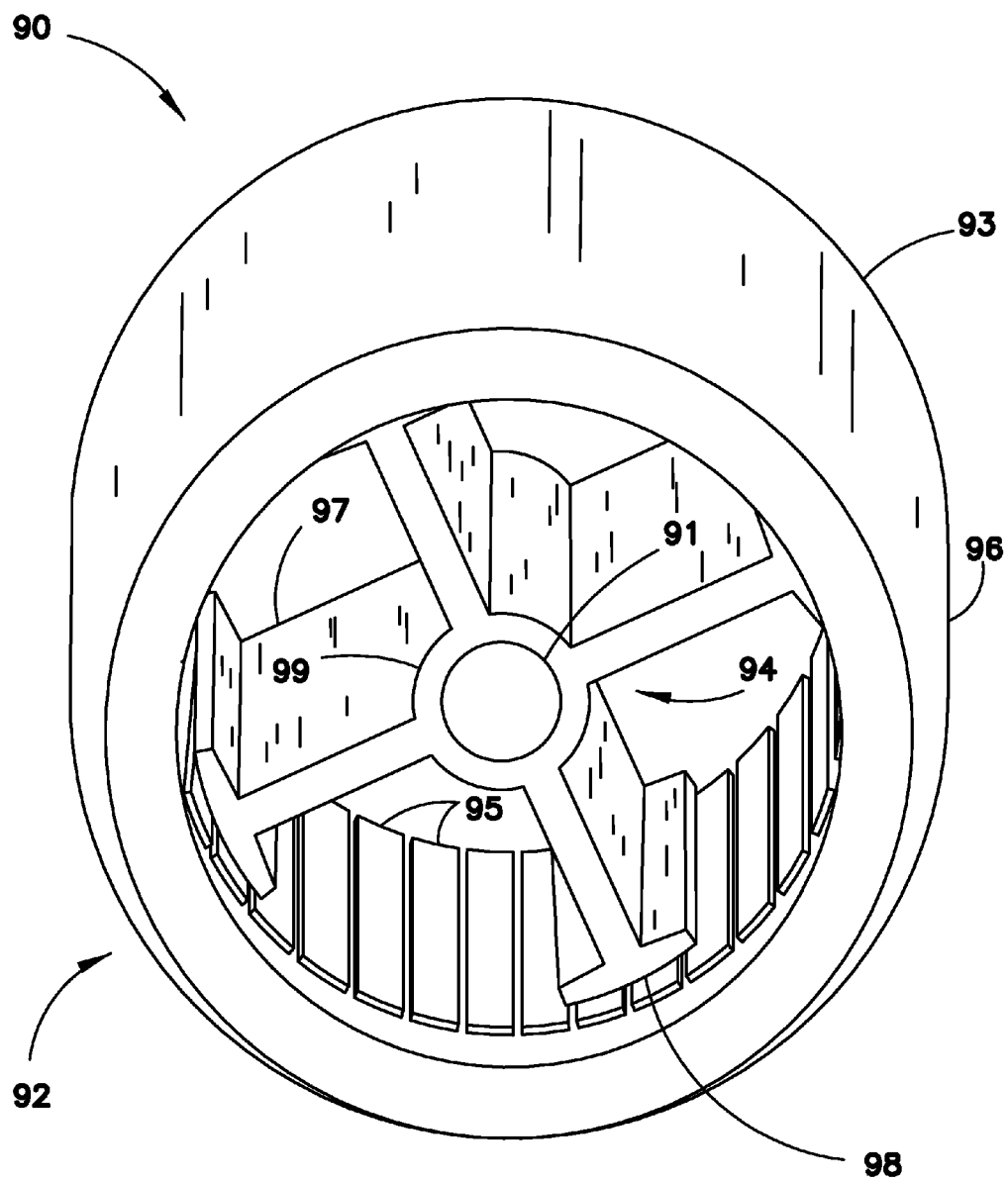
FIG. 2 is a perspective schematic view of the ARM of FIG. 1, according to one embodiment of the present disclosure, depicting a stator assembly including a distributed winding, and a rotor assembly.

Referring to FIG. 2, a perspective schematic view of an ARM 90, according to one embodiment of the present disclosure, is depicted. The ARM 90 includes a stator assembly 92 and a rotor assembly 94. The stator assembly 92 includes a stator body 93 with a plurality of stator teeth 95 coupled thereto. Windings 96 are provided around and about the stator body 93 and the stator teeth 95. The rotor assembly 94 is centrally mounted within the stator assembly 92. The rotor assembly 94 includes a plurality of outwardly protruding poles 97 each having a pole face 98 that is substantially parallel with an interior surface defined by adjacent stator teeth 95, except as defined by the pole taper, defined and described further below. The rotor assembly 94 further includes a rotor core 99 and a shaft 91 centrally located about the rotor core 99. The ARM 90 depicted in FIG. 2 includes a large number of stator teeth about which one or multiple distributed winding are positioned and which can be energized by one or multiple phases. The rotor assembly 94 is depicted with four outwardly protruded poles 97, although it may include less or more poles.

While not shown, it should be appreciated that the ARM 90 can be designed to in a configuration wherein an associated rotor assembly (similar to, however, different than, e.g., the rotor assembly 94) is positioned outside a corresponding stator assembly (similar to, however, different than, e.g., the stator assembly 92). In such a configuration, the rotor assembly is positioned on the outside of the stator assembly.

When the ARM 90 is operated in a principal torque-producing rotational direction 142b (see FIG. 4), the ARM 90 generates a high torque density. However, when the ARM 90 is operated in the opposite direction 142a, the torque density of the ARM 90 is lower since the maximum current which can be used while avoiding saturation is small, as discussed further below.

It should be observed that the tailoring of the rotor shape to achieve maximum flux over the poles is a function of the direction of the desired torque. In an electric machine, such as the ARM 90 both torque and speed are signed quantities (i.e., both have directions). When the ARM 90 is operated as a motor (i.e., the ARM 90 receives electrical power and converts that to mechanical power), both the torque and speed have the same sign (i.e., in the same direction). On the other hand, when the ARM 90 is operated as a generator (i.e., the ARM 90 receives mechanical power and converts that to electrical power), the torque and speed have opposite signs (i.e., in opposite directions). The ARM 90 is designed to greatly improve the torque in a given direction by sacrificing torque in the opposite direction. The tapering on the outwardly protruding poles 97 is such that a maximum allowed flux density can be achieved over the entirety of the outer surface, also referred to as pole taper 164 (see FIG. 4).

Figure 3:
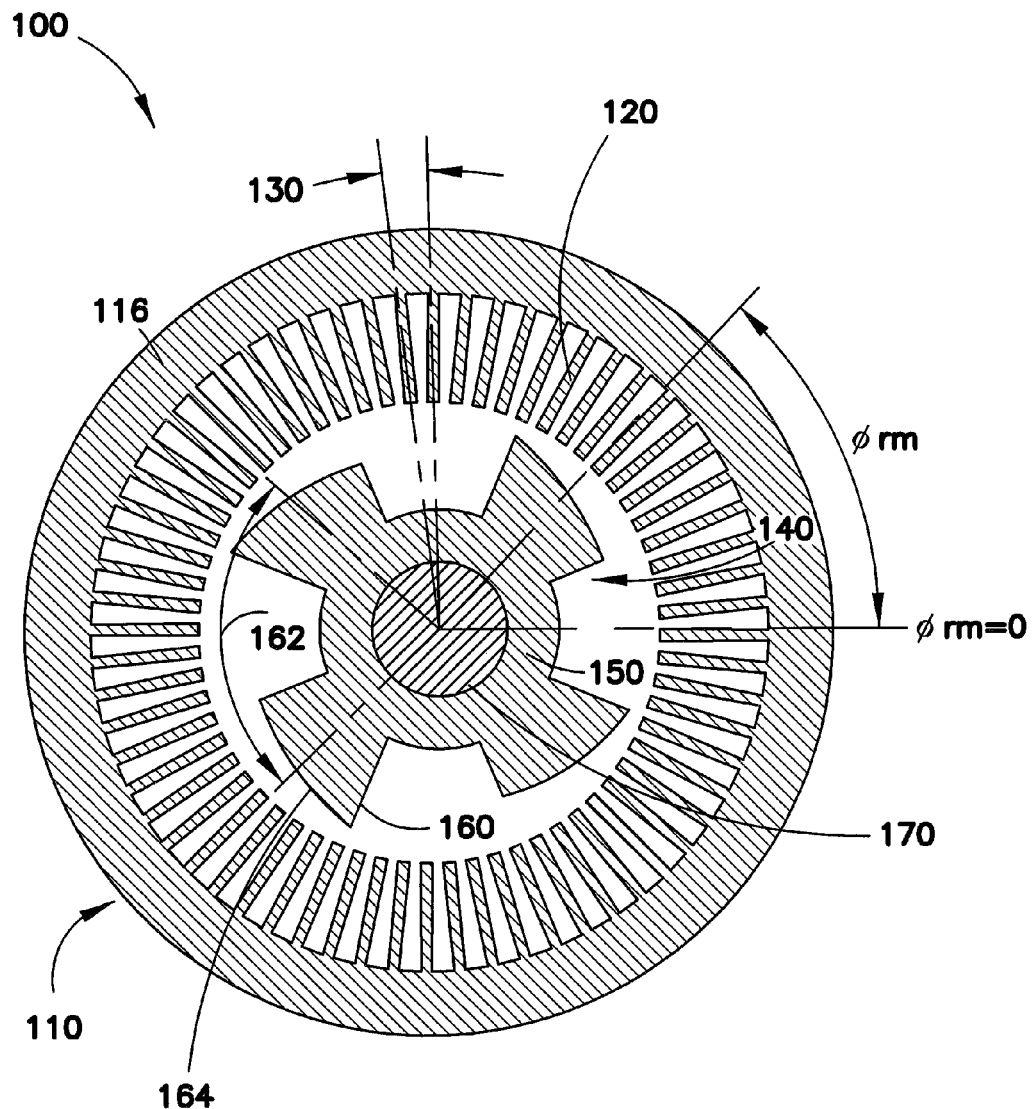
FIG. 3 is a cross sectional schematic view of the stator assembly and the rotor assembly of an ARM, according to one embodiment of the present disclosure.

Referring to FIG. 3, a cross sectional schematic view of a stator assembly 110 and a rotor assembly 140 of an ARM 100, according to another embodiment of the present disclosure is depicted. The stator assembly 110 is a stationary member of the ARM 100 while the rotor assembly 140 is the portion of the ARM 100 that moves (i.e., rotates about the stator assembly 110). The stator assembly 110 is cylindrical in shape including a housing 116 which transitions into a plurality of teeth 120 inwardly protruding toward center of the housing 116 along the radial direction. The teeth 120 are formed at intervals 130 along a circumferential direction. The number of teeth 120, which is a function of the intervals 130, is a design parameter that can affect torque ripple and other electrical and mechanical characteristics of the ARM 100 as is known to a person having ordinary skill in the art. The stator assembly 110 is configured to have a single or multi-phase distributed winding (not shown) that can be placed within the housing 116 and about the stator teeth 120.

The rotor assembly 140 includes a rotor core 150 and a plurality of outwardly protruding poles 160. Each of the plurality of outwardly protruding poles 160 has an asymmetrical shape, pointed out by the shape of pole tapers 164 and further discussed below. The rotor assembly 140 also includes a shaft 170 positioned at the center of the rotor core 150. The shaft 170 is configured to be coupled to a mechanical load (e.g., the mechanical load 80 depicted in FIG. 1). The outwardly protruding poles 160 are formed at intervals 162 along a circumferential direction. The number of outwardly protruding poles 160, which is a function of the intervals 162, is a design parameter that can affect torque ripple and other electrical and mechanical characteristics of the ARM 100 as is known to a person having ordinary skill in the art.

It should be noted that the ARM 90 and the ARM 100 are two different embodiments embodying the same concept of an asymmetric pole taper. It should be noted also that the rotor assembly 94 depicted in FIG. 2 can be made to be lighter than the rotor assembly 140 depicted in FIG. 3.

Figure 4:
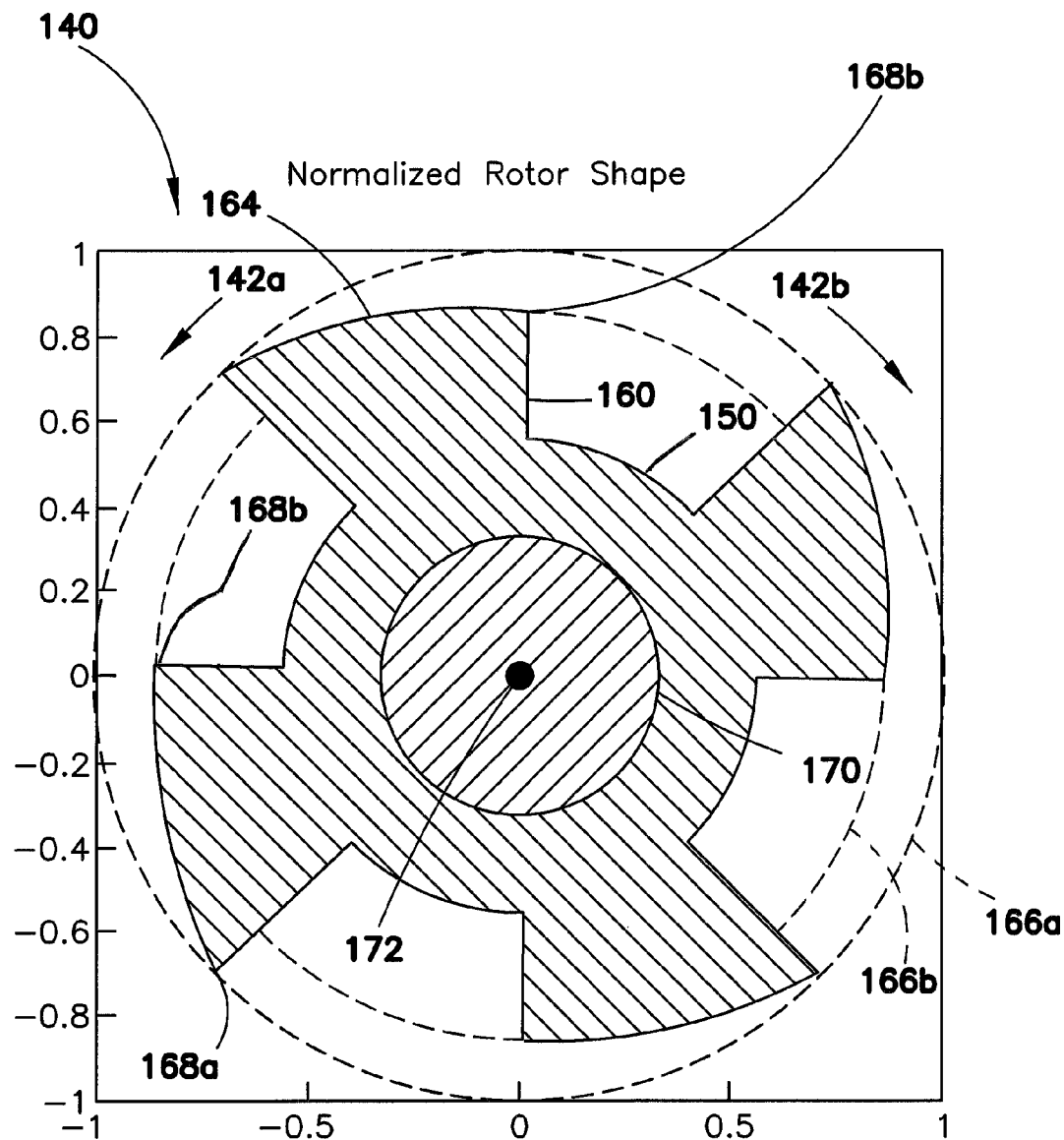
FIG. 4 is a normalized cross sectional schematic view of the rotor assembly of FIG. 3.

Referring to FIG. 4, a normalized cross sectional schematic view of the rotor assembly 140 is depicted for improved clarity over the cross sectional schematic view of FIG. 3. Two imaginary circles 166a and 166b define the pole tapers 164. The larger imaginary circle 166a is coincident with the trailing edges 168a of the outwardly protruding poles 160 while the smaller imaginary circle 166b is coincident with the leading edges 168b, when the rotor assembly 140 is rotating in the principal torque-generating direction of arrow 142b. The ratio of diameters between the smaller imaginary circle 168b and the larger imaginary circle 168a in one embodiment is about 0.8 to 1.0. The curvature of the pole tapers 164 is established by a curved surface between the leading edges 168b and the trailing edges 168a. In the embodiment depicted in FIG. 4, a first portion (i.e., the leading edge 168b) of the pole taper 164 (also referred to as a continuous outer surface, or simply outer surface, of the outwardly protruding pole) is a first distance away from the center 172 of the rotor assembly 140. This first distance is defined by the radius of the imaginary circle 166b. However, a second portion (i.e., the trailing edge 168a of the outer surface 164) of the outer surface (i.e., pole taper 164) is a second distance away from the center 172 of the rotor assembly 140. This second distance is defined by the radius of the imaginary circle 166a. In the embodiment depicted in FIG. 4, the first distance (i.e., the radius of the imaginary circle 166b) is smaller than the second distance (i.e., the radius of the imaginary circle 166a).

While a curved surface is depicted in FIG. 4 for the pole taper 164, other possible surfaces can be realized with the goal being to maximize flux density substantially over the entire outer surface 164. As discussed above, the tapering (i.e., the pole taper 164) on the outer surface of the outwardly protruding poles 160 is such that a maximum allowed flux density can be achieved substantially over the entirety of the outer surface (i.e., the pole taper 164). The maximum allowed flux density is defined by an amount of flux that saturates the material of the outwardly protruding poles 160 based on its shape. Therefore, the pole taper 164 depicted in FIG. 4 is influenced by shapes and configuration of the stator assembly 110 (see FIG. 3) and the rotor assembly 140. Other shapes may result in differing pole tapers 164.

It should be appreciated that it is the flux density on the stator teeth 120 over the outwardly protruding poles 160 that define the pole taper 164. It should be noted that the flux density in the stator teeth 120 and the outwardly protruding poles 160 are similar. However, the flux density in the stator teeth 120 becomes higher as the teeth conduct the flux over the slots between the teeth 120. Thus, the goal is to cause the flux in all the stator teeth 120 that are over the outwardly protruding poles 160 to be large and uniform.

Additionally, the shape of the rotor assembly 140 and in particular the shape of the pole tapers 164 of the outwardly protruding poles 160 in relationship to the stator assembly 110 and in particular to its teeth 120, results in a flux density that is substantially uniform over the entire surface of the outwardly protruding poles 160 and in particular over the pole tapers 164. As a result more torque is generated since a higher level of flux density is generated over each pole taper 164. This concept is demonstrated by referring to FIGS. 5A, 5B, 5C, 6A, 6B, and 6C.

Therefore, the pole taper 164 is designed 1) to generate a maximum induced flux density over substantially the entire outer surface (i.e., pole taper 164) of the outwardly protruding poles 160; and 2) to generate a uniform flux density over substantially the entire outer surface (i.e., pole taper 164) of the outwardly protruding poles 160.

Figure 5A:
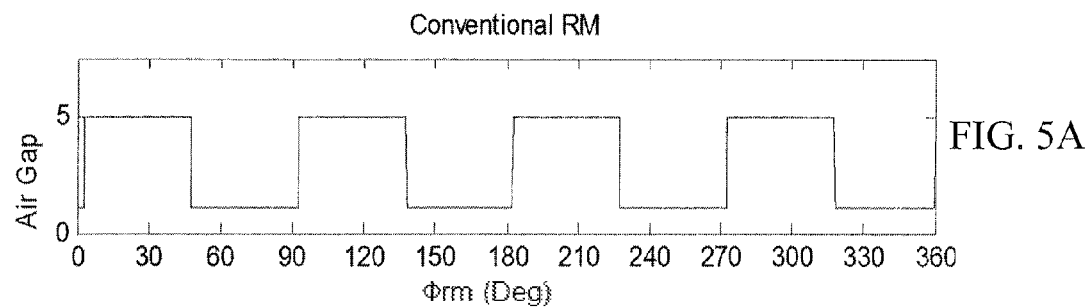
FIG. 5A is a graph of air gap between outer surfaces of poles of a rotor assembly and stator teeth of a stator assembly measured as a function of angular position relative to a radial rotor axis of the rotor assembly measured in degrees in a conventional reluctance machine.
Figure 9A:
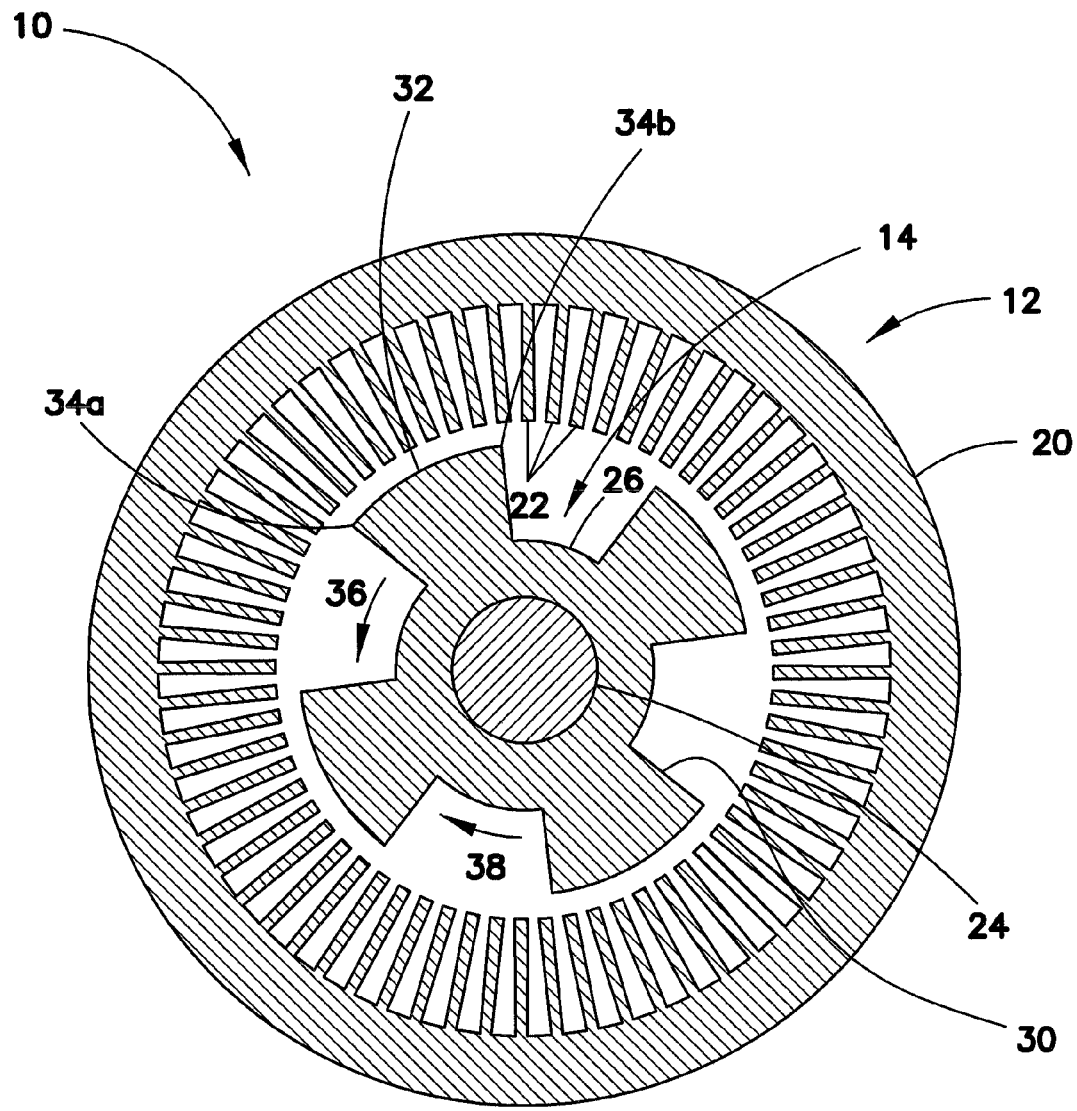
FIG. 9A is a perspective view schematic of a typical reluctance machine, according to one exemplary embodiment found in the prior art, depicting a reluctance machine with distributed windings (not shown) distributed about a stator assembly and further including a rotor assembly.

Referring to FIG. 5A, a graph of air gap between outer surfaces of poles (i.e., pole faces 32 depicted in FIG. 9A) of a rotor assembly 14 (see FIG. 9A) and stator teeth 22 of a stator assembly 12 (see FIG. 9A) measured as a function of angular position relative to a radial rotor axis of the rotor assembly measured in degrees in a conventional reluctance machine is depicted. Referring to FIG. 5A, the air gap between radial portions of about 45° and 90°, i.e., the air gap associated with one of the pole faces 32 of one protruded pole 30 and the stator teeth 22, is depicted. As is apparent in FIG. 9A, the spacing between the pole faces 32 and the teeth 22 is substantially constant. Further as seen in FIG. 5A, the air gap between radial dimensions of about 0° and 45°, i.e., the air gap associated between the rotor core 26 and the stator teeth 22 is larger and also remains substantially constant. The air gap for the remainder of the rotor assembly 14 (i.e., between about 90° and 360°) is similar to the air gap between 0° and 90°.

Figure 5B:
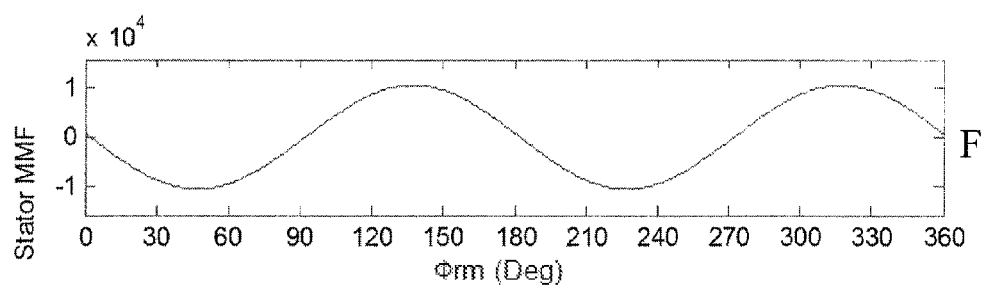
FIG. 5B is a graph of magnetomotive force (MMF) measured in ampere-turn as a function of angular position relative to the radial rotor axis of the rotor assembly measured in degrees in a conventional reluctance machine.
Figure 9B:
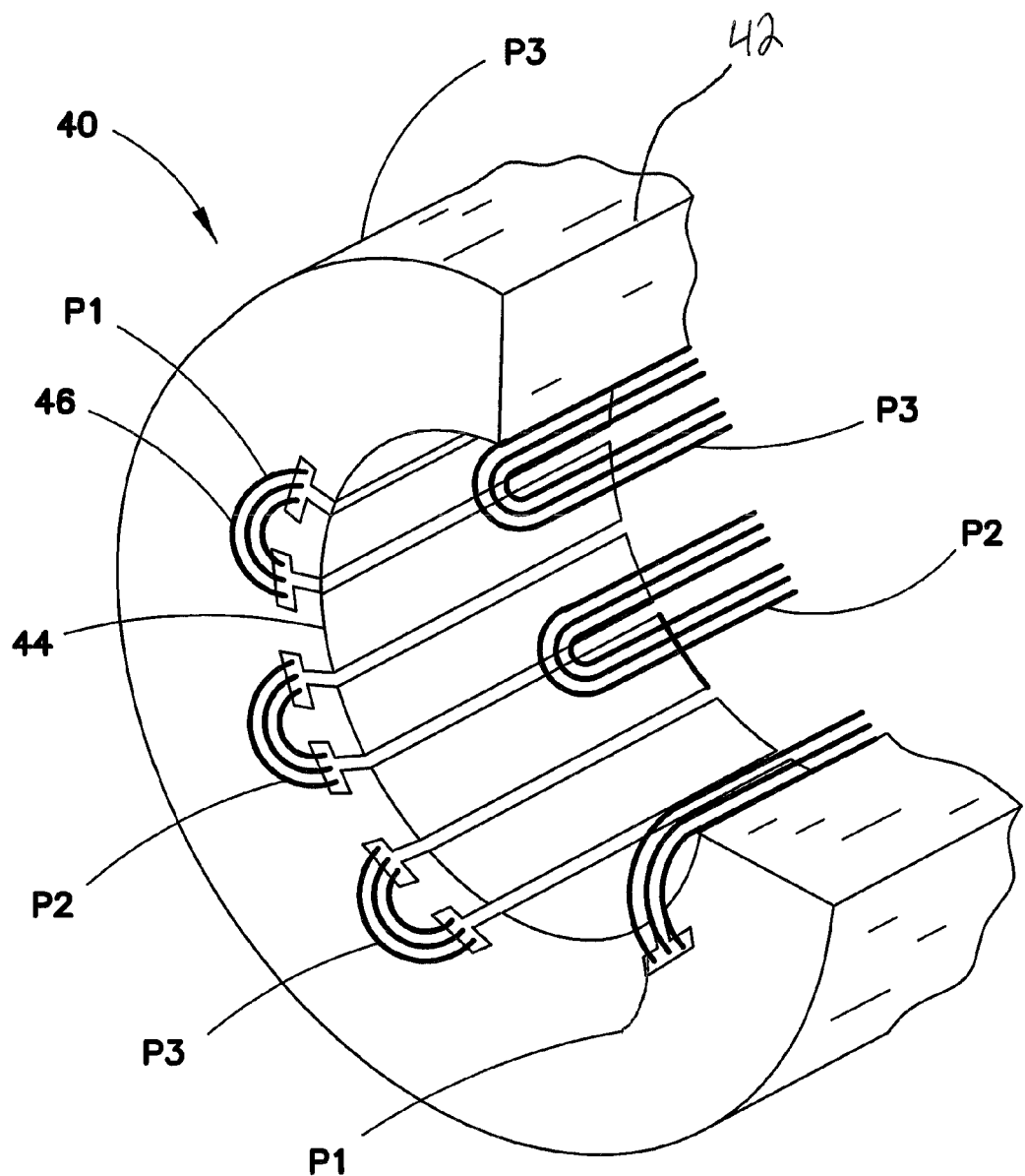
FIG. 9B is a partial perspective schematic view of a stator assembly, according to another exemplary embodiment found in the prior art, depicting a stator assembly with concentrated windings configured for a three-phase power connectivity.

Referring to FIG. 5B, a graph of MMF measured in ampere-turn as a function of angular position relative to the radial rotor axis of the rotor assembly measured in degrees in a conventional reluctance machine is depicted. The MMF created by the stator over the radial dimensions of 0° and 360° is depicted for the conventional reluctance machine. The MMF is in the shape of a sinusoidal graph. The shape of the MMF is based on the current waveform provided to the windings 46 (see FIG. 9B) of the stator assembly 40.

Figure 5C:
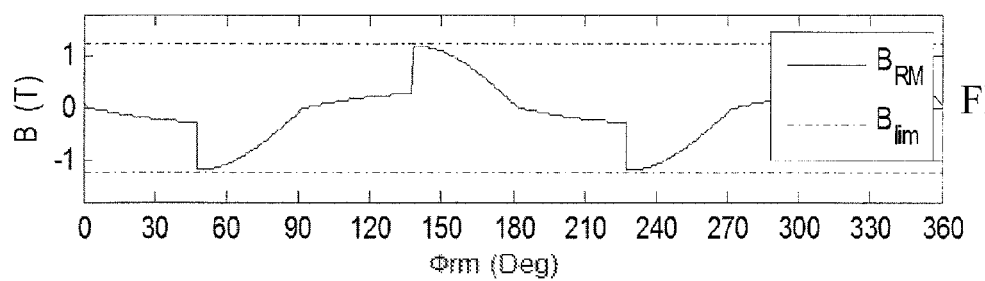
FIG. 5C is a graph of magnetic field measured in Tesla as a function of angular position relative to the radial rotor axis of the rotor assembly measured in degrees in a conventional reluctance machine, when the reluctance machine is operating in either a clockwise or a counter clockwise direction.

Referring to FIG. 5C, a graph of magnetic field measured in Tesla as a function of angular position relative to the radial rotor axis of the rotor assembly measured in degrees in a conventional reluctance machine, when the reluctance machine is operating in either a clockwise or a counter clockwise direction, is depicted. The magnetic field (B) (otherwise referred to as radial flux density or simply flux density) is induced into the rotor assembly 14, and in particular into the protruded poles 30, over the radial dimensions of 0° and 360°, when the reluctance machine is operating in either a clockwise 38 (see FIG. 9A) or a counter clockwise direction 36, is depicted. It should be noted that the dashed lines in FIG. 5C denotes the maximum flux density before the rotor assembly material reaches flux saturation. As is apparent, the induced field is at its maximum effect only for a short portion of the pole face 32, in particular a region associated with the leading edge 34b of a pole face 32 of a pole 30 (as shown in FIG. 5C a region between about 45° and about 50°). However, immediately past the leading edge 34b (i.e., after about 50°), the induced field loses its maximum effectiveness as the field's magnitude moves from about −1 T to about 0 at about 90°. The change in the induced field from −1 to 0 over the pole face 32 (i.e., corresponding to radial dimensions of about 45° and 90°) results in a limited output torque for the conventional reluctance machine. Therefore, the induced field, resulting in the output torque, is only maximized during a small portion of the pole face 32 as the rotor assembly 14 rotates about the stator assembly 12.

It should be observed that the rotor shape of a conventional reluctance machine substantially achieves the same flux density over the poles irrespective of the direction of the desired torque. Thus, the induced field depicted in FIG. 5C is substantially the same with the rotor assembly 14 rotating in the direction of arrow 36 or 38 (see FIG. 8A).

In comparison, the rotor assembly 140 (see FIG. 4) of the present disclosure provides a novel rotor designed to induce a uniform and maximized field in the outwardly protruding poles 160 over the pole tapers 164 when the rotor is rotating in one direction (e.g., designated by the arrow 142b).

Figure 6A:
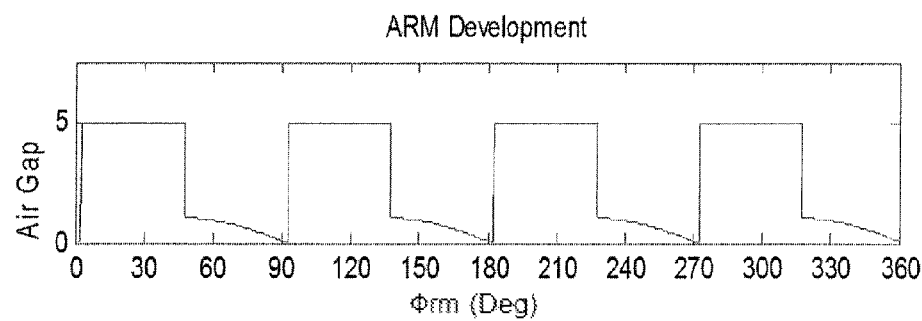
FIG. 6A is a graph of air gap between outer surfaces of outwardly protruding poles of a rotor assembly and stator teeth of a stator assembly measured as a function of angular position relative to the radial rotor axis of the rotor assembly measured in degrees according to one embodiment of an ARM of the present disclosure.

Referring to FIG. 6A, a graph of air gap between outer surfaces 164 of poles 160 of a rotor assembly 140 (see FIG. 4) and stator teeth 120 (see FIG. 3) of a stator assembly 110 measured as a function of angular position relative to a radial rotor axis of the rotor assembly measured in degrees in the rotor/stator assemblies 110/140 (see FIG. 3) according to the present disclosure, is depicted. The first air gap is depicted between radial dimensions of about 45° and 90°, i.e., the air gap associated with one of the pole tapers 164 of one outwardly protruded pole 160 and the stator teeth 120. As is apparent in FIG. 3 of FIG. 4, the spacing between the pole taper 164 and the teeth 120 is not constant. Instead, at about 45° the air gap over one pole taper 164 is at its maximum, while at about 90° the air gap over the pole taper 164 is at its minimum. Further as seen in FIG. 6A, the air gap between radial dimensions of about 0° and 45°, i.e., the air gap associated between the rotor core 150 and the stator teeth 120, is larger and remains substantially constant. The air gap for the remainder of the rotor assembly 140 (i.e., between about 90° and 360°) is similar to the air gap between 0° and 90°.

Figure 6B:
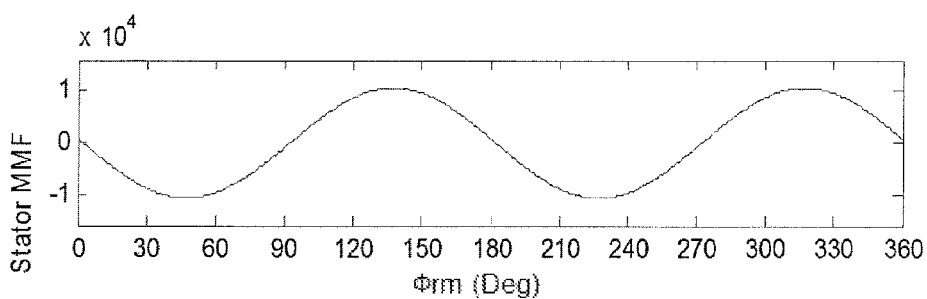
FIG. 6B is a graph of MMF measured in ampere-turn as a function of angular position relative to a radial rotor axis of the rotor assembly measured in degrees according to one embodiment of an ARM of the present disclosure.

Referring to FIG. 6B, a graph of MMF measured in ampere-turn as a function of angular position relative to the radial rotor axis of the rotor assembly measured in degrees according to one embodiment of an ARM of the present disclosure is depicted. The MMF created by the stator over the radial dimensions of 0° and 360° is depicted for the ARM 100. The MMF is in the shape of a sinusoidal graph. The shape of the MMF is based on the current waveform provided to the windings (not shown) of the stator assembly 110 (see FIG. 3).

Figure 6C:
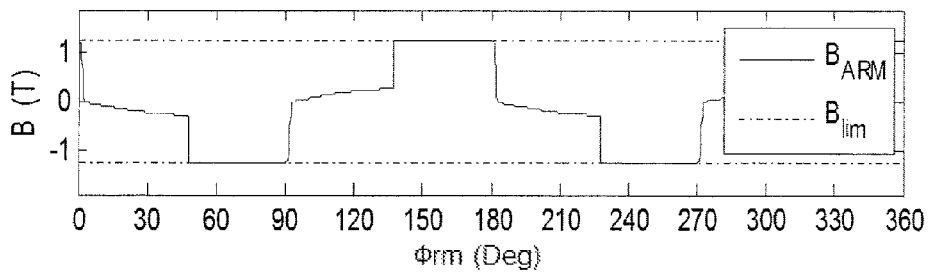
FIG. 6C is a graph of magnetic field measured in Tesla as a function of angular position relative to the radial rotor axis of the rotor assembly measured in degrees according to one embodiment of an ARM of the present disclosure, when the ARM is operating in a principal torque-producing direction.

Referring to FIG. 6C, a graph of magnetic field measured in Tesla measured as a function of angular position relative to a radial rotor axis of the rotor assembly measured in degrees according to one embodiment of an ARM of the present disclosure, when the ARM is operating in a principal torque-producing direction, is depicted. The magnetic field (B) that is induced into the rotor assembly 140, and in particular into the outwardly protruded poles 160, when the ARM is operating in a principal torque-producing direction 142b (i.e., clockwise rotational direction), is depicted. As is apparent, the induced field is substantially at its maximum effect over the entire surface of the pole taper 164, in particular a region associated between the leading edge 168b and the trailing edge 168a of a pole taper 164 of an outwardly protruding pole 160 (as shown in FIG. 5C a region between about 45° and about 90°). The induced field is uniform over the said region at about −1 T. Only after the trailing edge 168b at about 90° does the magnitude of the induced field diminish from about −1 T to about 0 (i.e., at about 90°). The uniformity of the induced field at about −1 T over the pole taper 164 (i.e., corresponding to radial dimensions of about 45° and 90°) and at about 1 T over the pole taper 164 (i.e., corresponding to radial dimensions of about 135° and 180°) results in an improved output torque for the ARM 100. Therefore, the induced field, resulting in output torque, is maximized during substantially the entire portion of the pole taper 164 as the rotor assembly 140 rotates about the stator assembly 110 in the direction 142b.

Since a higher amount of output torque is produced, the reluctance machine can be smaller, lighter, and less costly as compared to a conventional reluctance machine producing the same output torque. In contrast, for the same size reluctance machine, the ARM 100 of the present disclosure can generate a higher level of output torque in one direction 142b, which is an acceptable limitation in many applications where the output torque needs to be high only in one principal direction. In addition, due to the uniformity of the induced field, the ARM of the present disclosure produces smaller amounts of ripple in the output torque. Lower torque ripple can result in a smoother operation of the ARM 100 even in lower speeds.

Figure 7:
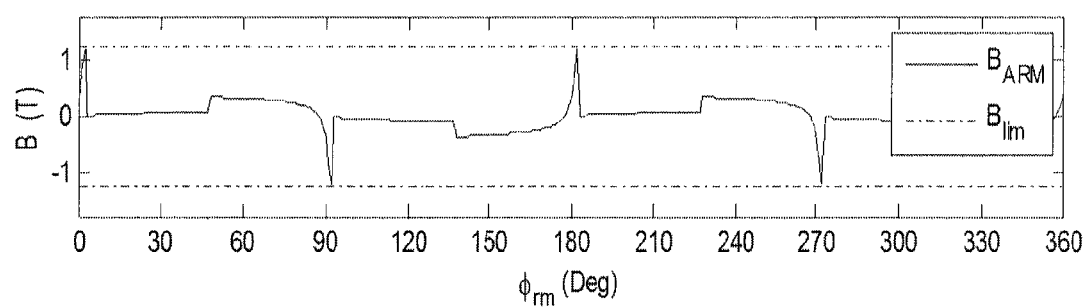
FIG. 7 is a graph of magnetic field measured in Tesla as a function of angular position relative to the radial rotor axis of the rotor assembly measured in degrees according to one embodiment of an ARM of the present disclosure, when the ARM is operating opposite to a principal torque-producing direction.

Referring to FIG. 7, a graph of magnetic field measured in Tesla as a function of position of angular position relative to a radial rotor axis of the rotor assembly measured in degrees according to one embodiment of an ARM of the present disclosure, when the ARM 100 is operating opposite to the principal torque-producing direction (i.e., rotating according to the direction 142a), is depicted. When the ARM is operating opposite to a principal torque-producing direction (e.g., direction denoted by the arrow 142a as show in FIG. 4), magnetic field (B) that is induced into the rotor assembly 140, and in particular into the outwardly protruded poles 160, over the radial dimensions of 0° and 360°, is disorganized. It should be noted that FIG. 7 corresponds to FIG. 6A with respect to the air gap configuration. When the ARM 100 is operated to produce torque in the opposite of the intended direction, the torque density of the ARM 100 is lower since the maximum current which can be used while avoiding saturation is small, as well as maximum flux density is generate at very narrow portions of the pole taper 164, as shown in FIG. 7. The reason is that in order to change the sign of the torque, the phase of current relative to the rotor must be changed. This change in phase interacts with the tapering of the rotor in a flux-debilitating way. Referring to FIG. 7, it should be noted that the amplitude of the stator MMF of the ARM is much lower than the MMF used to produce the torque in the intended direction; however increasing it would cause a high degree of magnetic saturation and the associated loss.

Figure 8:
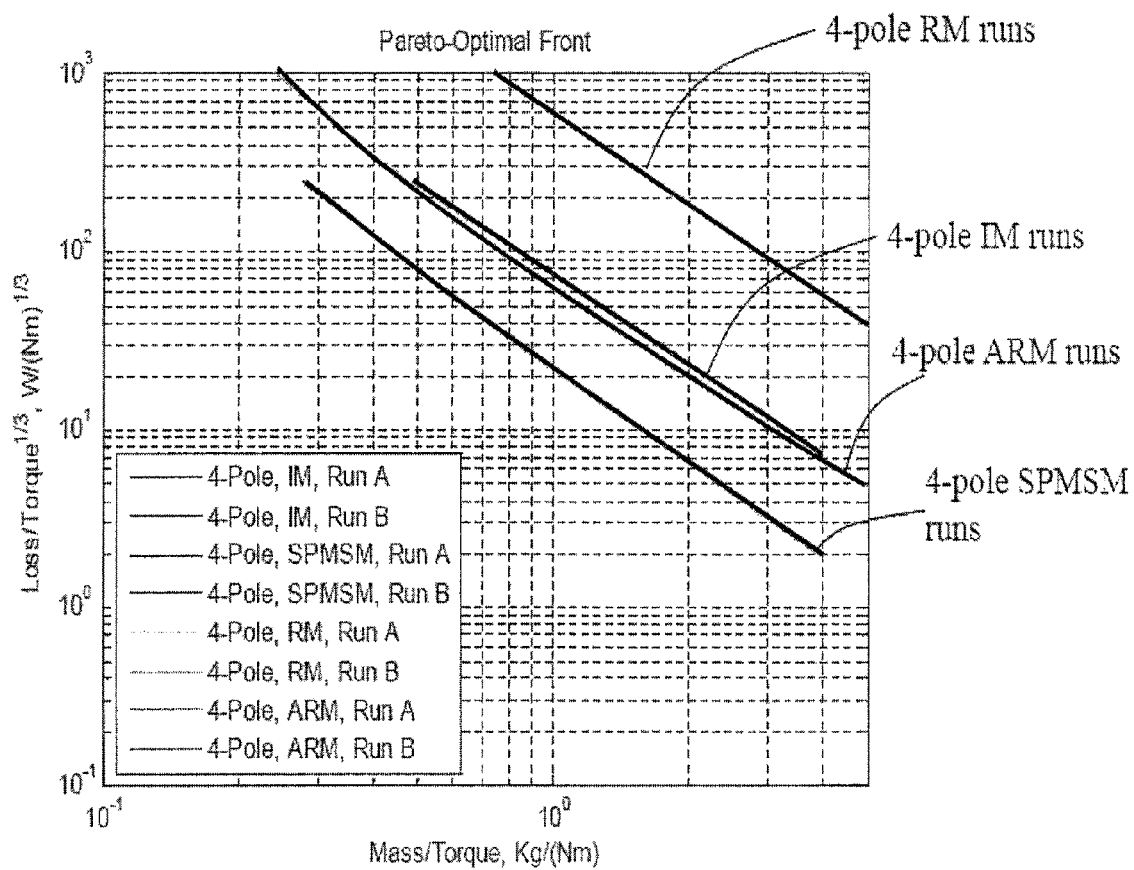
FIG. 8 is a Pareto-Optimal Front graph of loss over the cube root of torque measured in W/(Nm)^(1/3) as a function of mass/torque measured in Kg/Nm for various machines.

Referring to FIG. 8, a Pareto-Optimal Front graph of loss over the cube root of torque measured in W/(Nm)^(1/3) as a function of mass/torque measured in Kg/Nm for various machines, is depicted. The Pareto-Optimal Fronts graph, which is known to a person having ordinary skill in the art, depicts performance of several machine topologies, namely the induction machine (IM), surface-mounted permanent magnet synchronous machine (SPMSM), a conventional synchronous reluctance machine (RM), and the ARM. Each machine topology is optimized to minimize loss and mass for a given torque. From the Pareto-optimal front comparison in FIG. 8, the ARM topology is shown to have a better tradeoff than the RM or IM.

Although the ARM 100 does not necessarily produce a higher torque density than the PMSM, the ARM can be used in many applications where the use of PMSM is undesirable due to other concerns with regard to faults or high machine construction cost. The ARM does not have the fault current concern of the PMSM because it does not have a permanent magnet flux source to drive stator fault currents. Additionally, the ARM has a low manufacturing cost since it does not require rare-Earth magnet materials, which add to the cost of the machine. Additionally, the ARM has zero or negligible electrical losses when rotating at no-load (which can be useful in flywheel applications). The ARM has zero or negligible rotor losses, which can be useful in vacuum environments. Also, the ARM does not have temperature constraints resulting from the use of the permanent magnet materials.

In operation, with respect to FIG. 1, electrical power can be provided from the voltage source 72 in DC, single-phase AC, or polyphase AC form. The electrical power can then be optionally converted to a three-phase output by the power converter 74 and provided to the ARM 76. The ARM 76 in this configuration is configured to receive electrical power and convert it to mechanical power to thereby apply the mechanical power to the mechanical load 80. A position signal can be placed on the signal output 77a and provided to converter controller 78 to control the power converter 74.

Alternatively, the ARM 76 can be configured to convert mechanical power to electrical power. In this configuration, the mechanical load 80 is providing mechanical power to the ARM 76 and in turn, the ARM 76 converts the mechanical power to electrical power which is provided to the power converter 74 or directly to the voltage source 72.

While the asymmetrical rotor concept described here has been applied to a reluctance machine, it is recognized that the same concept could be applied to other types of machines which use a continuously rotating magnetic field, wherein the rotor rotates in synchronism with the field, including permanent magnet and wound rotor synchronous machines.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A reluctance machine, comprising:
   a stationary member
      including a housing,
      a plurality of windings disposed in the housing,
      a plurality of electrical connections each electrical connection coupled to a corresponding winding of the plurality of windings, and
      a plurality of teeth coupled to the housing;
   a rotating member having a center including
      a mechanical coupling member formed about the center, and
      a plurality of outwardly protruding poles centrally located within the stationary member each outwardly protruding pole having a continuous outer surface adjacent to at least one tooth of the plurality of teeth;
   wherein each outwardly protruding pole formed asymmetrically with respect to a centerline such that each outer surface of each outwardly protruding pole having a first portion being a first distance away from the center and a second portion being a second distance away from the center; and
   wherein the first distance is substantially different from the second distance.

2. The reluctance machine of claim 1, wherein upon applying a plurality of electrical currents in a first form, each to a corresponding electrical connection of the plurality of electrical connections, the rotating member produces a first torque output in a first rotational direction and upon applying a plurality of currents in a second form, each to a corresponding electrical connection of the plurality of electrical connections, the rotating member produces a second torque output in a second opposite rotational direction, wherein the magnitude of each current of the plurality of electrical currents in the first form is substantially equal to a corresponding current of the plurality of electrical currents in the second form.

3. The reluctance machine of claim 2, wherein magnitude of the first torque output is higher than magnitude of the second torque output.

4. The reluctance machine of claim 1, wherein the plurality of windings are distributed about the housing.

5. The reluctance machine of claim 1, wherein each of the windings of the plurality of windings is configured to be coupled to an electrical current having a corresponding phase coupled to a corresponding electrical connection.

6. The reluctance machine of claim 5, wherein the plurality of windings are distributed about the housing.

7. The reluctance machine of claim 1, wherein the first portion of each outwardly protruding pole is equidistant away from the center and the second portion of each outwardly protruding pole is equidistant away from the center.

8. The reluctance machine of claim 1, wherein upon applying a plurality of electrical currents, each to a corresponding winding of the plurality of windings, magnetic field induced in each of the outwardly protruding poles is substantially uniformly distributed over the outer surface of each of the outwardly protruding poles.

9. The reluctance machine of claim 8, wherein the uniform magnetic field is substantially equal to a maximum magnetic field that can be induced by the stationary member.

10. A drive system, comprising:
   a voltage source; and
   a reluctance machine configured to be coupled to a mechanical load, the reluctance machine including
      a stationary member including
         a housing,
         a plurality of windings disposed in the housing,
         a plurality of electrical connections each electrical connection coupled to a corresponding winding of the plurality of windings, and
         a plurality of teeth coupled to the housing,
      and a rotating member having a center including
         a mechanical coupling member formed about the center, and
         a plurality of outwardly protruding poles centrally located within the stationary member each outwardly protruding pole having a continuous outer surface adjacent to at least one tooth of the plurality of teeth,
   wherein each outwardly protruding pole formed asymmetrically with respect to a centerline such that each outer surface of each outwardly protruding pole having a first portion being a first distance away from the center and a second portion being a second distance away from the center; and wherein the first distance is substantially different from the second distance.

11. The drive system of claim 10, wherein the plurality of electrical connections are coupled to the voltage source.

12. The drive system of claim 10, further comprising:

a power converter configured to i) receive electrical power from the voltage source in a first form and provide electrical power to the reluctance machine in a second form and ii) receive electrical power from the reluctance machine in the second form and provide electrical power to the voltage source in the first form, wherein the electrical power in the first form is an electrical current having an initial phase, and the electrical power in the second form includes a plurality of electrical currents each having a corresponding phase and coupled to a corresponding electrical connection of the plurality of electrical connections, and wherein each of the windings of the plurality of windings is configured to be coupled to a corresponding electrical current of the plurality of electrical currents.

13. The drive system of claim 10, wherein upon applying a plurality of electrical currents in a first form, each to a corresponding electrical connection of the plurality of electrical connections, the rotating member produces a first torque output in a first rotational direction and upon applying a plurality of currents in a second form, each to a corresponding electrical connection of the plurality of electrical connections, the rotating member produces a second torque output in a second opposite rotational direction, wherein the magnitude of each current of the plurality of electrical currents in the first form is substantially equal to a corresponding current of the plurality of electrical currents in the second form.

14. The drive system of claim 13, wherein magnitude of the first torque output is higher than magnitude of the second torque output.

15. The drive system of claim 10, wherein the first portion of each outwardly protruding pole is equidistant away from the center and the second portion of each outwardly protruding pole is equidistant away from the center.

16. The drive system of claim 10, wherein upon applying a plurality of electrical currents, each to a corresponding winding of the plurality of windings, magnetic field induced in each of the outwardly protruding poles is substantially uniformly distributed over the outer surface of each of the outwardly protruding poles.

17. The drive system of claim 16, wherein the uniform magnetic field is substantially equal to a maximum magnetic field that can be induced by the stationary member.

18. The drive system of claim 12, further comprising:

a position sensor configured to sense position of the rotor assembly with respect to the stationary member and generate an electrical position signal in response thereto; and a converter controller coupled to the reluctance machine and to the power converter, wherein the converter controller is configured to receive the electrical position signal, and provide a control signal to the power converter to thereby control output power to the reluctance machine in the second form.

19. The drive system of claim 18, wherein the power converter is configured to control output power to the reluctance machine in the second form by controlling current waveforms.

20. The drive system of claim 10, wherein the reluctance machine is configured to i) receive electrical power and convert the electrical power to mechanical power, and ii) receive mechanical power and convert the mechanical power to electrical power.

* * * * *